United States Patent
Ogilvie

(10) Patent No.: US 9,393,856 B2
(45) Date of Patent: Jul. 19, 2016

(54) VEHICLE WINDOW COVER WITH DEPLOYABLE AND RETRACTABLE CANOPY

(71) Applicant: Daniel R. Ogilvie, Winnipeg (CA)

(72) Inventor: Daniel R. Ogilvie, Winnipeg (CA)

(*) Notice: Subject to any disclaimer, the term of this patent is extended or adjusted under 35 U.S.C. 154(b) by 0 days.

(21) Appl. No.: 14/681,404

(22) Filed: Apr. 8, 2015

(65) Prior Publication Data

US 2015/0292232 A1 Oct. 15, 2015

Related U.S. Application Data

(60) Provisional application No. 61/977,385, filed on Apr. 9, 2014.

(51) Int. Cl.
*E04H 15/06* (2006.01)
*B60J 11/06* (2006.01)
*B60J 1/20* (2006.01)
*B60J 11/08* (2006.01)

(52) U.S. Cl.
CPC .. *B60J 11/06* (2013.01); *B60J 1/20* (2013.01); *B60J 1/2011* (2013.01); *B60J 11/08* (2013.01); *E04H 15/06* (2013.01)

(58) Field of Classification Search
CPC ......... E04H 15/02; E04H 15/06; E04H 15/58; B60J 11/00; B60J 11/06; B60J 1/04; B60J 9/00; B60J 1/2077; B60J 1/2094; B60J 5/0494; B60J 11/08; B60J 1/20; B60J 1/2011
USPC .......... 135/88.01, 88.05, 88.13, 96, 132–133, 135/151, 115, 117, 119, 120.4, 88.09, 88.1; 160/97.8, 97.9, 370.21, 352–354, 87, 160/103; 296/77.1, 97.7–97.9, 102, 138, 296/152
See application file for complete search history.

(56) References Cited

U.S. PATENT DOCUMENTS

| | | | |
|---|---|---|---|
| 2,665,754 A | 1/1954 | Claussen et al. | |
| 2,682,427 A | 6/1954 | Bright | |
| 2,892,498 A | 6/1959 | Lee | |
| 4,938,522 A * | 7/1990 | Herron | B60J 11/00 150/166 |
| 4,976,487 A | 12/1990 | Ramos et al. | |

(Continued)

FOREIGN PATENT DOCUMENTS

| | | |
|---|---|---|
| EP | 980775 | 2/2000 |
| GB | 2408728 | 6/2005 |

(Continued)

*Primary Examiner* — Winnie Yip
(74) *Attorney, Agent, or Firm* — Kyle R. Satterthwaite; Ryan W. Dupuis; Ade & Company Inc.

(57) ABSTRACT

A vehicle window cover features a flexible sheet attachable to a vehicle door over a window space thereof. A window opening in the sheet is provided overlies the window space of the vehicle door with the sheet in the installed position. A mesh screen is attached to the sheet in a position spanning over the window opening therein, and a movable canopy is connected to the sheet at an area thereof spanning across a top end of the window opening. The canopy is movable between a deployed position reaching outwardly from the sheet over the window opening and a collapsed position retracted back toward the sheet from the deployed position. An elastic perimeter member is stretched around a perimeter of the door to secure the cover in place over a entirety of the door's exterior. Tether lines are staked to the ground to anchor the canopy in the deployed positions.

17 Claims, 7 Drawing Sheets

(56) References Cited

U.S. PATENT DOCUMENTS

| | | | |
|---|---|---|---|
| 5,203,601 A * | 4/1993 | Guillot | B62D 21/183 296/102 |
| 5,579,799 A * | 12/1996 | Zheng | A63B 9/00 135/117 |
| 5,605,369 A * | 2/1997 | Ruiz | B60J 11/06 150/166 |
| 5,676,414 A | 10/1997 | Hammond | |
| 5,765,584 A * | 6/1998 | Heisler | E04H 15/14 135/117 |
| 5,915,399 A * | 6/1999 | Yang | B60J 11/00 135/119 |
| 6,099,067 A * | 8/2000 | Butterworth | B60J 11/00 135/88.05 |
| 6,145,573 A * | 11/2000 | Chen | B60J 1/2011 160/368.1 |
| 6,352,299 B1 | 3/2002 | Ames et al. | |
| 6,367,536 B1 | 4/2002 | St. Louis | |
| 6,543,830 B1 * | 4/2003 | Stuck | B60J 7/10 296/77.1 |
| 6,565,139 B2 * | 5/2003 | Bayerle | B60J 11/00 135/127 |
| 6,869,127 B2 | 3/2005 | Dohle | |
| 7,121,315 B2 | 10/2006 | Ly | |
| 7,137,660 B2 * | 11/2006 | Weddington | A45B 23/00 296/105 |
| 7,703,468 B2 * | 4/2010 | Cantwell | E04H 15/32 135/117 |
| 8,899,252 B2 * | 12/2014 | Yang | E04H 15/14 135/117 |
| 2004/0188036 A1 | 9/2004 | Hann | |
| 2004/0222662 A1 | 11/2004 | Dohle | |
| 2005/0274060 A1 | 12/2005 | Lederle et al. | |

FOREIGN PATENT DOCUMENTS

| | | |
|---|---|---|
| JP | 1988051820 | 4/1968 |
| JP | 3041640 | 7/1997 |
| JP | 1997328016 | 12/1997 |
| JP | 1999115483 | 4/1999 |
| WO | 9710964 | 3/1997 |
| WO | 02096687 | 12/2002 |
| WO | 2006089350 | 8/2006 |

* cited by examiner

VEHICLE WINDOW COVER WITH DEPLOYABLE AND RETRACTABLE CANOPY

CROSS REFERENCE TO RELATED APPLICATIONS

This application claims benefit under 35 U.S.C. 119(e) of Provisional Application Ser. No. 61/977,385, filed Apr. 9, 2014.

FIELD OF THE INVENTION

The present invention relates generally to vehicle window covers that fit onto a vehicle door, and more particularly to such covers that incorporate a selectively deployable and retractable canopy to allow the user to shield the window opening from rain, wind or excess sunlight.

BACKGROUND

Several different types of vehicle window covering devices are known in the prior art, including devices useful as sun shades, insect screens and temporary covers for placement over broken windows.

U.S. Pat. No. 5,676,414 shows a vehicle screen in FIG. 34 for use in converting a conventional vehicle into a camper, where the unit spans the full height and width of the vehicle door. However, this device does not install on the door itself, but rather installs within the opening of a sliding door of a mini-van or the like.

U.S. Patent Application Publication US2004/0188036 teaches a temporary screen for placement in the window opening of vehicle door, and mentions screens that fit over an 'entire door' of a vehicle in the background section, but provides no particular examples.

UK Patent Application GB2408728 and U.S. Pat. No. 6,352,299 disclose screens and covers that are sized to fit over only the window-containing upper portion of the vehicle door, but then use one or more straps or tie down straps that wrap around the bottom edge of the door between the interior and exterior of the vehicle to secure the device screen or cover in place over the window.

U.S. Patent Application Publication US2004/0222662 teaches a temporary replacement window that fits over the window-containing upper half of vehicle door, and in FIG. 19 shows a bungee or other elastic member running along the perimeter of the cover to automatically tighten around the door frame on the interior side thereof to secure the cover in place.

U.S. Pat. No. 2,665,754 shows a window cover with an elastic draw string, where the elasticity keeps the cover tight on three of four sides of the window, and tying of the draw string secures the fourth side. Again, this reference does not show a unit that engages around the full perimeter of the door, and thus only covers the window-containing upper area of the door.

Japanese patent reference JP1999115483 shows a vehicle window screen that includes a semi-circular mesh area co-operable with a shade movable between open and closed positions relative to the mesh to switch between an airflow-enabling insect-protection mode and a sun-shade mode. However, the reference again does not disclose a full-door unit, and it also lacks a built-in rain guard or canopy over the mesh-equipped screen area.

Any of the forgoing references that include a mesh screen for allowing airflow into the vehicle through the window opening of the vehicle door lack sufficient protection against rain penetration when the airflow-enabling mesh is employed.

U.S. Pat. No. 4,976,487 shows a combination of an insect screen and a canopy, but uses a mechanical arrangement of notable bulk and complexity to the mount to the window-containing upper half of the vehicle door.

U.S. Pat. No. 2,892,498 shows a vehicle window screen with a sun visor, but the visor is a separate non-collapsible rigid unit that attaches and detaches from the screen, and covers only the top end of the window opening, leaving other areas open for rain penetration, particularly in windy conditions.

U.S. Patent Application Publication 2005/0274060 shows a vehicle window insect screen and awning combination in FIG. 13, but the awning is a non-collapsible rigid unit that is attached to the vehicle separately from the screen.

Other references in the same general field, but less pertinent to the present invention, include EP980775, JP3041640, JP1988051820, JP1997328016, U.S. Pat. No. 2,682,427, U.S. Pat. No. 6,367,536, U.S. Pat. No. 6,869,127, U.S. Pat. No. 7,121,315, WO02/096687, WO1997/010964 and WO2006/089350.

Applicant has developed a unique vehicle window cover that features a deployable and collapsible canopy and fits over the entire vehicle door in order to provide optimal rain protection during the use the cover's airflow-enabling mesh screen, while allowing retraction of canopy for convenient and compact storage.

SUMMARY OF THE INVENTION

According to one aspect of the invention there is provided a vehicle window cover apparatus comprising:

a flexible main sheet configured for selective attachment to a vehicle door in an installed position spanning over a window space bound by a frame of said vehicle door;

a window opening in the flexible main sheet at a location that overlies the window space of the vehicle door with the flexible main sheet in the installed position;

a mesh screen attached to the flexible main sheet in a position spanning over the window opening therein;

a movable canopy connected or connectable to the flexible main sheet at an area thereof spanning across a top end of the window opening, the canopy being movable between a deployed position reaching outwardly from the flexible main sheet over the window opening and a collapsed position retracted back toward the flexible main sheet from the deployed position; and a flexible window shade separate and distinct from the movable canopy, attached to the flexible main sheet at an area spanning across a bottom end of the window opening, and movable independently of the movable canopy between a closed position spanning over the window opening and blocking airflow therethrough and an open position withdrawn from over the window opening to allow airflow therethrough;

whereby deployment of the panel and opening of the flexible window shade places the vehicle window cover in a weather-protected airflow-enabled mode, and collapse of the canopy and closing of the flexible window shade places the vehicle window cover in an airflow-blocking and light-obstructing mode.

Preferably the canopy has a curved shape spanning across the top end of the window opening and downward along opposing sides of the window opening.

Preferably the top end and sides of the window are of a curved configuration that conforms with the curved shape of the canopy.

Preferably the canopy comprises a flexible canopy sheet having a proximal end connected or connectable to the flexible main sheet, and a distal edge movable toward and away from the proximal end into the deployed and retracted positions respectively.

Preferably the canopy comprises an edge reinforcement member connected or connectable to the flexible canopy sheet to maintain a predetermined shape of the distal edge thereof.

Preferably the edge reinforcement member is curved.

Preferably a dimension of the flexible canopy sheet measured between the proximal end and the distal edge thereof tapers in lateral directions moving outwardly toward the sides of the window opening from a central position thereover so that the flexible canopy sheet terminates at tapered corner areas of the flexible canopy sheet on the opposing sides of the window opening, and the edge reinforcement member is arranged to span fully from one of said tapered corner areas to the other.

Preferably the flexible canopy sheet comprises an edge-adjacent channel running along the distal edge thereof and the edge reinforcement member is received or receivable in said edge-adjacent channel.

Preferably the edge-adjacent channel has at least one open end by which the edge reinforcement member is insertable into and removable from said edge-adjacent channel.

Preferably the movable canopy comprises at least one support member connectable to the flexible canopy sheet in a position running from adjacent the proximal end thereof to adjacent the distal edge thereof in the deployed position.

Preferably the flexible canopy sheet comprises a cross-wise channel running cross-wise to the distal edge thereof and the extension support member is selectively insertable into and removable from said cross-wise channel.

Preferably there is provided a securing mechanism operable to secure the movable canopy in the collapsed position.

Preferably the securing mechanism comprises a strap mechanism attached to the flexible main sheet and comprising a fastener operable to secure the strap in a position holding the collapsed movable canopy in place against the flexible main sheet.

Preferably there is provided a holding mechanism arranged to secure the flexible shade in a compact condition in the open position that spans a smaller surface area than in the closed position.

Preferably the holding mechanism is arranged to secure the flexible shade in a protected position that is covered by the deployed position of the canopy.

Preferably the holding mechanism comprises a first fastening element positioned on a first surface of the window shade that faces inwardly through the window opening in the closed position of said window shade at a location on said first surface adjacent the bottom end of the window, and a mating second fastening element positioned on an opposing second surface of the window shade that faces outwardly away from the window opening in the closed position of said window shade at a location on said second surface that is disposed intermediately between the top and bottom ends of the window opening in the closed position of the window shade.

Preferably the flexible main sheet comprises an elastic member extending substantially around a full perimeter of said main flexible sheet to secure the flexible main sheet to the vehicle door in a position fully spanning an exterior of said vehicle door by stretching of said elastic member around a perimeter of said vehicle door to an interior side of said vehicle door.

Preferably a surface area of the vehicle window cover delimited by a perimeter of the flexible main sheet thereof exceeds a surface area of the vehicle door delimited by a perimeter of said vehicle door.

Preferably at least one flexible tether has one end thereof coupled to the canopy and an opposing end attached or attachable to a ground stake for anchoring the tether in a tensioned state holding the canopy stable in the deployed position.

According to a second aspect of the invention there is provided a vehicle window cover apparatus comprising:

a flexible main sheet configured for selective attachment to a vehicle door in an installed position spanning over a window space bound by a frame of said vehicle door;

a window opening in the flexible main sheet at a location that overlies the window space of the vehicle door with the flexible main sheet in the installed position;

a mesh screen attached to the flexible main sheet in a position spanning over the window opening therein; and an elastic member extending substantially around a full perimeter of said main flexible sheet to secure the flexible main sheet to the vehicle door in a position fully spanning an exterior of said vehicle door by stretching of said elastic member around a perimeter of said vehicle door to an interior side of said vehicle door.

BRIEF DESCRIPTION OF THE DRAWINGS

Preferred embodiments of the invention will now be described in conjunction with the accompanying drawings in which.

In the drawings like characters of reference indicate corresponding parts in the different figures.

DETAILED DESCRIPTION

Figure 1:
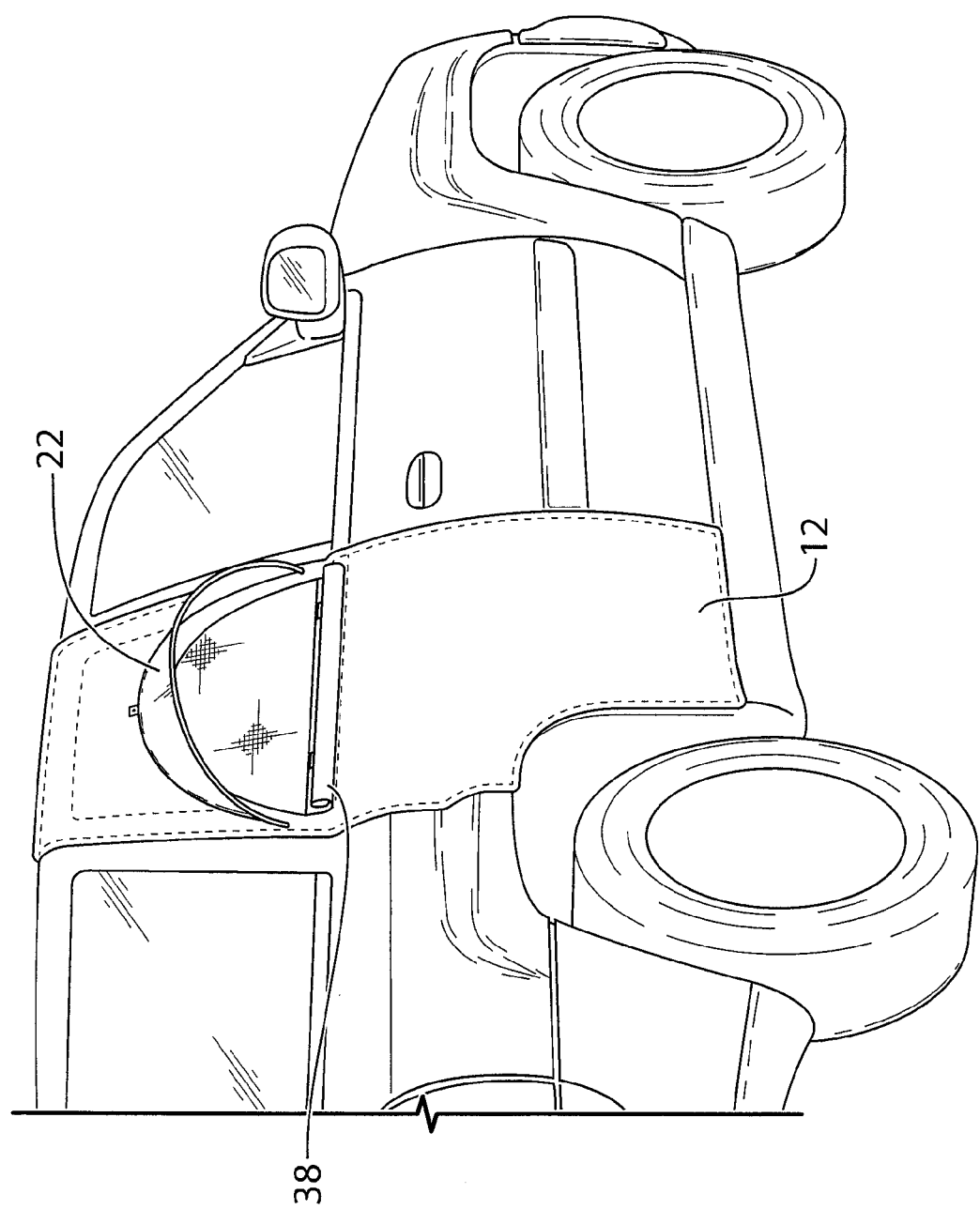
FIG. 1 is a perspective view of a vehicle window cover of the present invention installed on the rear door of a sport utility vehicle with a canopy of the window cover in a deployed position and a window shade of the window cover in an open position.
Figure 4:
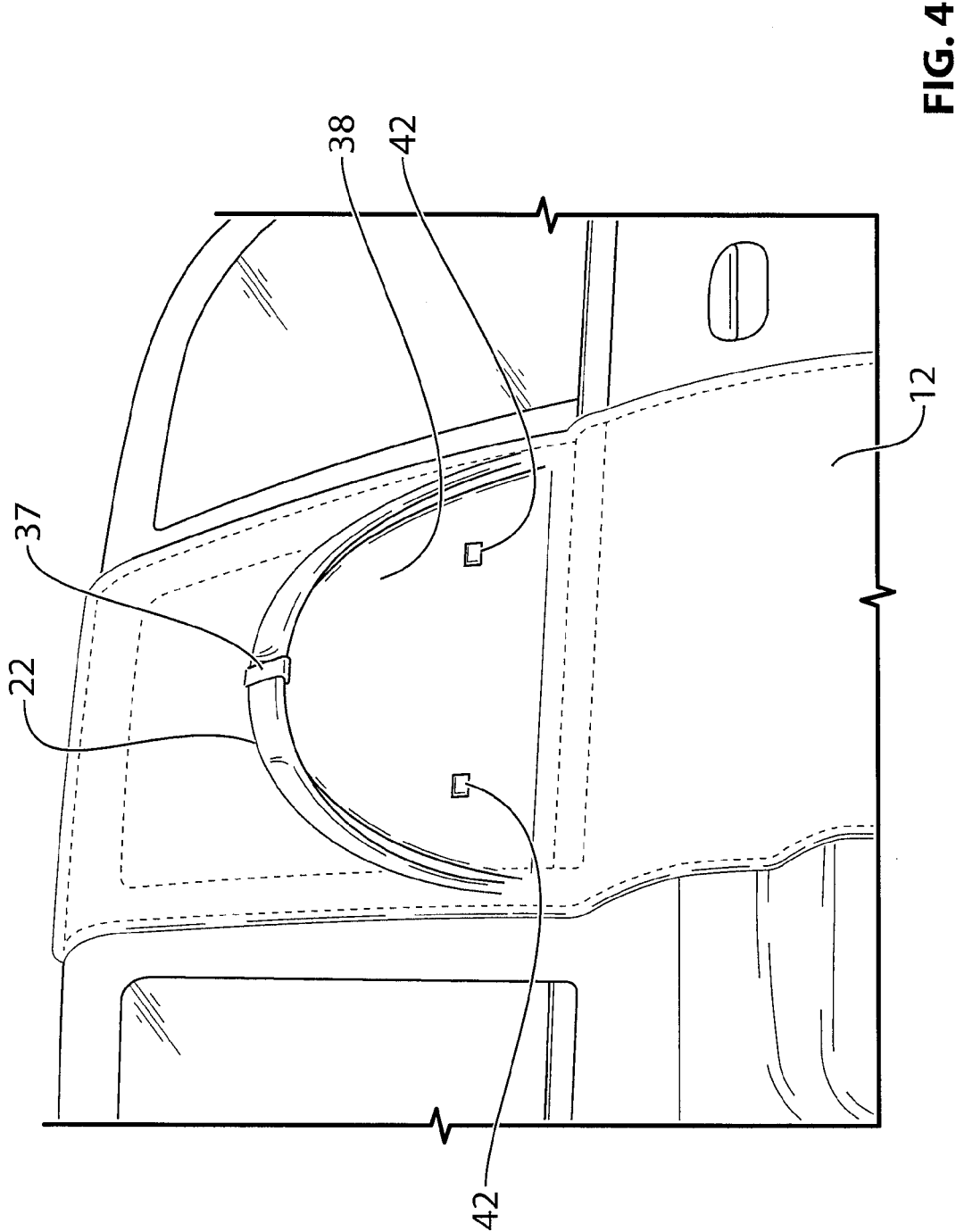
FIG. 4 is a perspective view of the window cover of FIG. 3 from another angle.

FIG. 1 illustrates a window cover 10 of the present invention in an installed position fitted over the exterior side of a rear door of a sport utility vehicle. The window cover 10 features a main sheet of flexible fabric 12 whose perimeter delimits a greater area than that of the vehicle door. As shown in FIG. 4, with the vehicle door in an open position, the perimeter edges of the main sheet 12 can be wrapped around the perimeter edges of the door from the exterior side thereof.

A bungee cord 14 or other elongated elastic member extends around the perimeter of the main sheet 12 in within a perimeter channel 16 that circumscribes the main sheet 12, for example as formed by a folded-over edge portion of the main sheet that is sewn back onto itself a short distance inward from its fold. A default length of the resilient bungee cord 14 is less than the full perimeter distance around the vehicle door, but can be stretched into an expanded condition exceeding the perimeter measurement of the door in order to allow the wrapping of the edges of the main sheet 12 over the perimeters edges of the door frame from the exterior side thereof, whereupon the elastic nature of the bungee cord will reduce its length back to its natural state on the inside of the door, thereby securing the cover to the door.

The two ends of the bungee cord may be fed through a spring-loaded cord stop, whereby a spring-loaded self-locking action of the cord stop can be released by squeezing together the ends of the cord stop to slide the cord stop toward or away from the ends of the bungee cord. This enables increase or decrease of the effective default length or size of the closed loop formed by the bungee cord around the perimeter of the sheet, thus adjusting the tightness of the cover's fit on the door. With the window cover 10 secured to the door in this manner, thus placing the majority of the main sheet's surface area outside the vehicle in a position overlying the majority of the door's exterior, the door is then closed, which acts to pinch the flexible fabric of the main sheet between the frame of the door and the door-surrounding portions of the vehicle body in order to further secure the the window cover in its installed position.

Turning back to FIGS. 1 and 2, the cover 10 features a window opening 18 that is cut through the main sheet 12, for example in the shape of a circular-segment, such as a semi-circle. A flexible sheet of mesh material 20 is sewn to the main sheet 12 in a position overlying the window opening and spanning the full area thereof. The window opening and the mesh material 20 installed thereover are positioned generally centrally of the main sheet's width at a distance inward from the perimeter edges thereof, and at a location residing in a top half of the sheet's height so as to overlie the window area of the vehicle door when installed thereon. Accordingly, with the cover in place on the vehicle door, and with the vehicle window rolled down into an open position from the window space in which the vehicle window resides when closed, the window opening and overlying mesh 20 of the cover 10 reside over the open window space of the vehicle door in order to allow airflow into and out of the vehicle interior, while the mesh 20 creates a bug screen to prevent insects from gaining entry to the vehicle interior.

Figure 2:
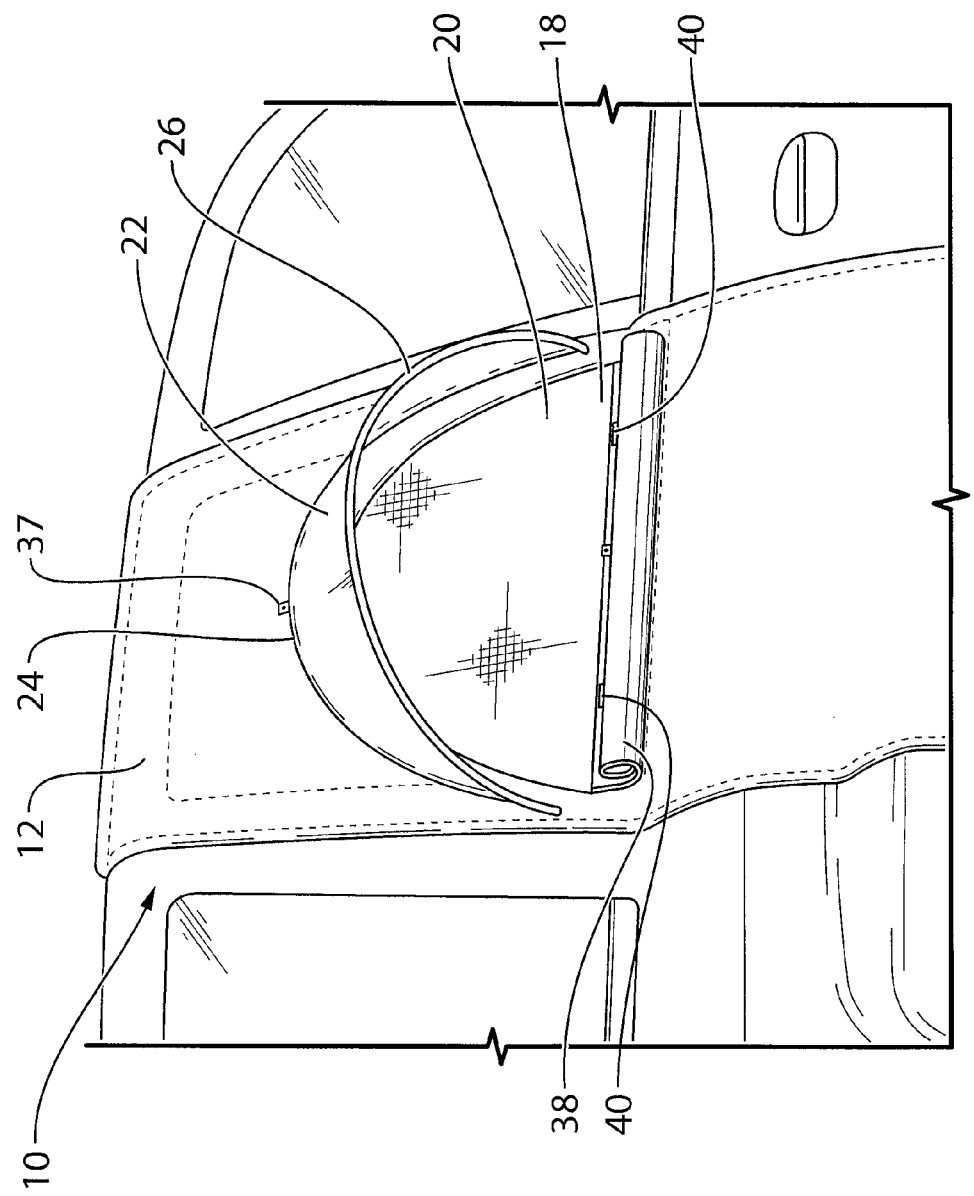
FIG. 2 is a close up partial perspective view of the vehicle window cover of FIG. 1.

Still referring to FIGS. 1 and 2, a smaller sheet 22 of flexible material is sewn to the larger main sheet 12 on a curved path that overlies and generally conforms in shape to an arcuate top end of the segment-shaped window opening 18 in the main sheet 12. The edge of the smaller sheet 22 that is sewn to the main sheet 12 defines a proximal end 24 of a canopy formed by this smaller sheet 22. From this proximal end, the canopy sheet 22 reaches outwardly away from the main sheet 12 at a downwardly slope to a free edge 26 of the smaller sheet that lies distal to the canopy's proximal end 24. A dimension of the canopy sheet 22 measured from its proximal end 24 to its opposing distal edge 26 is tapered in directions moving laterally outward from the peak of the canopy 22 that overlies the peak or apex of the window opening's top arcuate edge. Accordingly, on each side of the window opening, near the respective corner defined between the window opening's arcuate top edge and its horizontally linear bottom edge, the canopy sheet 22 terminates in a pointed or tapered corner 28, where the distal edge 26 of the canopy sheet 22 meets the sewn-in-place proximal end 24 thereof.

The distal canopy edge 26 in the illustrated embodiment lies in an obliquely oriented plane slopcaing upwardly and outwardly from the main sheet 12, and in this plane, has a smoothly curved profile that generally matches that of the proximal end 24 of the canopy 22. To support and maintain the distal canopy edge 26 in this position and shape, a bow-shaped insertion rod is received in an edge adjacent channel that runs along the distal edge 26 from the tapered corner 28 on one side of the window opening 18 to the tapered corner on the other side. This channel has at least one open end through which the bow-shaped insert rod can be inserted into and removed from the channel 32, whereby the arc of this bow-shaped insertion rod 30 maintains the aforementioned curvature of the canopy's distal end. The edge-adjacent channel may be formed a folded over edge portion of the canopy sheet 22 that is sewn back upon itself at a distance inward from its fold.

Additional support of the canopy 22 in the deployed position of FIGS. 1 and 2 is provided by a cross-wise insertion rod inserted into a cross-wise channel that is formed on an underside of the canopy sheet 22 to lie cross-wise to the free distal edge 26 at the apex or peak of the canopy. This channel is open at the distal end thereof that resides adjacent the distal edge of the canopy sheet 22, whereby the cross-wise insertion rod is insertable into the channel from this open end thereof so as to reach from the proximal end of the canopy sheet 22 to the peak of the bow-shaped edge-reinforcement rod. This props-up the peak of the canopy in order to prevent the same from sagging and to maintain a downward slope from the canopies proximal end to its distal edge. Following a curved path down both sides of the window opening in the main sheet 12 from an apex of the rounded canopy 22, rain fall occurring atop the canopy 22 will tend to run down the sides, and wind gusts from the sides of the canopy will tend to tend to be deflected from the sloped sides of the canopy in order to reduce wind loads compared to canopy designs with flat vertical sides.

Figure 3:
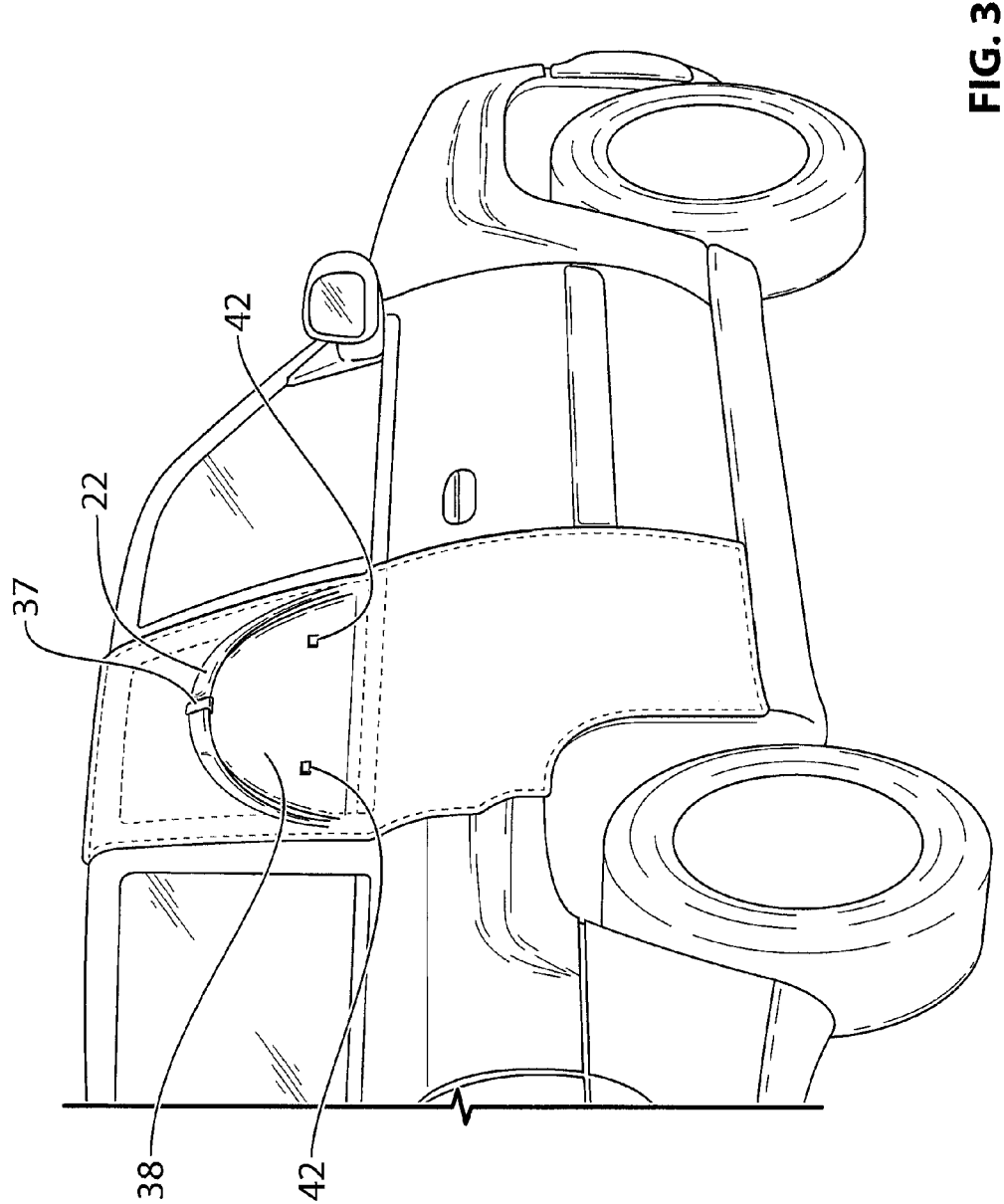
FIG. 3 is a perspective view of a vehicle window cover of FIG. 1 with the canopy of the window cover in a collapsed, retracted position and the window shade of the window cover in a closed position.

Turning to FIGS. 3 and 4, the canopy 22 can be retracted from the deployed position of FIGS. 1 and 2 and collapsed up against the main sheet 22. To accomplish thus, first the two insertion rods are removed from the canopy sheet 22, and then the canopy sheet 22 is pleat-folded, bunched-up or rolled-up against the main sheet 22. On the same outer surface of the main sheet 12 to which the canopy 22 is attached, a securing strap 37 has a first end sewn to the main sheet 12 above the canopy sheet 22. From its first end, the strap 37 passes downwardly between the main sheet 12 and the proximal end 24 of the canopy sewn thereto. Beneath the canopy, the strap 37 features a freely movable portion that is not fixed to the main sheet 12. Matable fastening elements are provided adjacent opposing ends of the securing strap 37, whereby with the canopy rolled or folded up against the main sheet 12 at the area above the window opening, the free end of the strap hanging below the canopy 22 can be pulled up and over the rolled/folded canopy 22 and fastened to the sewn-in place first end of the strap. The cooperating fastener elements on the strap may be matching elements of a snap fastener, button fastener, clip fastener, hook and loop fastener, or other fastener type. The strap 37 thus holds the collapsed canopy in its retracted position bunched or folded up against the main sheet 12.

FIGS. 3 and 4 also show the window opening being covered up by a window shade 38 that is formed by yet another panel or sheet of flexible fabric, which is cut in a shape similar to that of the window opening and is sewn to the main sheet 12 along the linear bottom edge of the window opening 18 at a matching linear edge of this circular-segment shade panel 38. The shade panel 38 has half of a zipper fastener sewn thereto in a position extending along the arcuate edge of the segment-shaped panel 38, and the mating other half of the zipper fastener is sewn to the main sheet 12 along the arcuate top edge thereof. As shown in FIGS. 3 and 4, with the zipper closed, the shade panel 38 thus fully overlies the window opening 18 and the mesh 20 in order to close off the same, thereby preventing airflow into and out of the vehicle interior and blocking or limiting sunlight from entering same. FIGS. 1 and 2 on the other hand show the zipper in an undone state, thus decoupling the arcuate edge of the window shade 38 from the arcuate area of the main sheet that resides between the top arcuate edge of the window opening 20 and the overlying canopy 22. Accordingly, the shade can hang from its sewn connection to the main panel in a position revealing the window opening and allowing airflow and light passage therethrough.

Near the linear edge of the segment shaped shade panel 38, a first pair of fastener elements 40 are sewn to an inner surface of the shade panel 38 that faces toward the window opening 20 and into the vehicle interior when the shade panel 38 is closed. A mating second pair of fastener elements 42 are sewn to the opposing outer surface of the shade panel that faces outwardly away from the window opening and the vehicle when the shade is closed. The second pair of fastener elements 42 are located at a further distance from the linear edge of the shade panel 38 so as to reside intermediately between the linear edge and the opposing arcuate edge of the shade, as shown in FIGS. 3 and 4. Turning back to FIGS. 1 and 2, this allows the shade 38 to be rolled up into a compact storage position when in the open condition unzipped from the main sheet 12, as shown in FIGS. 1 and 2. Here, the rolled up shade 38 lies closely adjacent to the bottom edge of the window opening 20 and is held in this state by engagement of the fastener elements 42 on the rolled up portion of the shade 38 with the fastener elements 40 on the portion of the shade that hangs downwardly from the shade's attachment to the main sheet 12. The cooperating fastener elements on the shade 38 may be mating elements of a snap fastener, button fastener, clip fastener, hook and loop fastener, or other fastener type.

Figure 5:
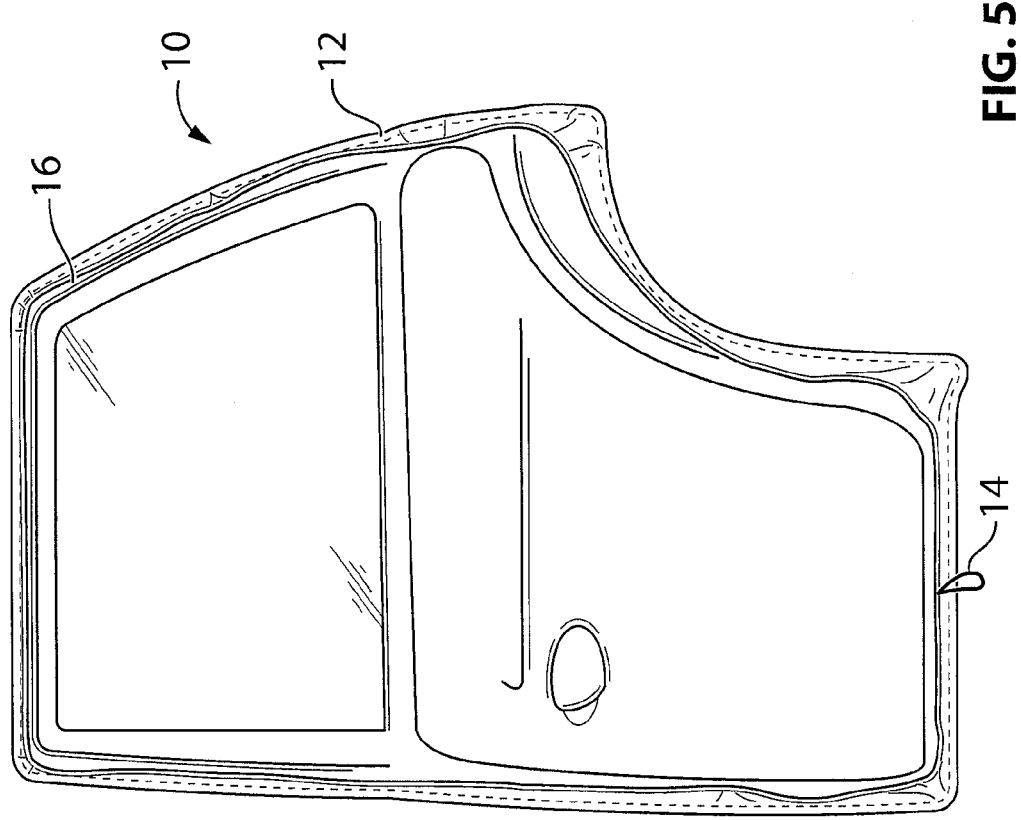
FIG. 5 is a rear view of the window cover of FIG. 1 from an interior side of the vehicle door, illustrating installation of the window cover with the vehicle door in an open position.
Figure 6:
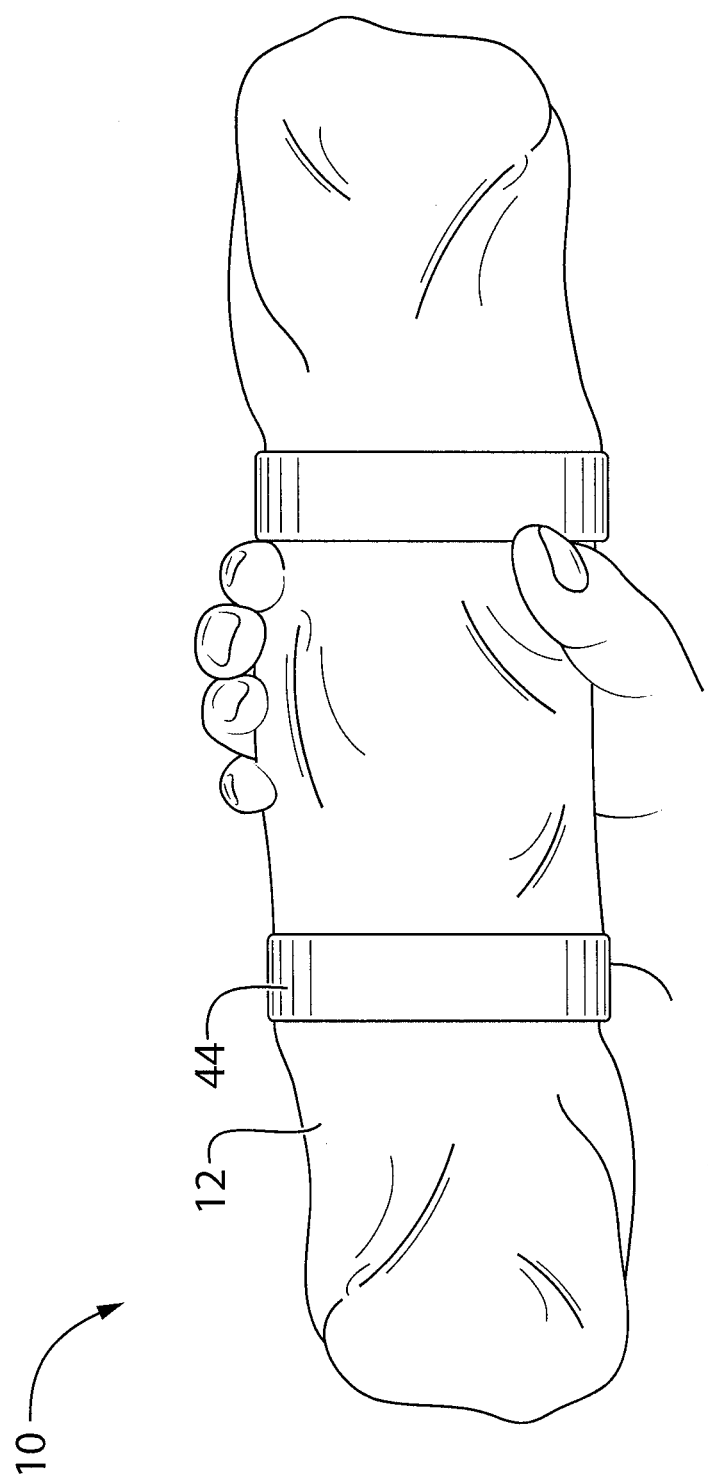
FIG. 6 illustrates the window cover of FIG. 1 rolled up into a compact condition for transport or storage.

With the canopy, shade and main body of the window cover apparatus 10 all being formed of flexible sheets or panels of fabric, the resulting unit formed by these components can be folded, rolled or bunched up into an extremely compact storage format, as shown in FIG. 5. This is accomplished by first retracting the canopy and closing the shade, as shown in FIGS. 3 and 4, then removing the unit from the vehicle door by stretching and withdrawing the elasticized perimeter of the main sheet from around the door perimeter, and finally rolling the unit up into the small package size of FIG. 5. As shown, the cover may be accompanied by a suitable storage strap or band 44 for securing the unit in this rolled, folded or bunched up state. The unit is not only small enough to easily carry in one hand, but also small enough to store in the glove compartment of the vehicle, and to be carried in a pocket, backpack or other small bag, case or enclosure. The storage strap or band may be elasticized, and/or feature suitable fastening elements for tightening and securing of the strap around the compacted unit. The band or strap may be permanently or removably attached to the unit in order to prevent loss or misplacement, or may be a separate component.

Figure 7:
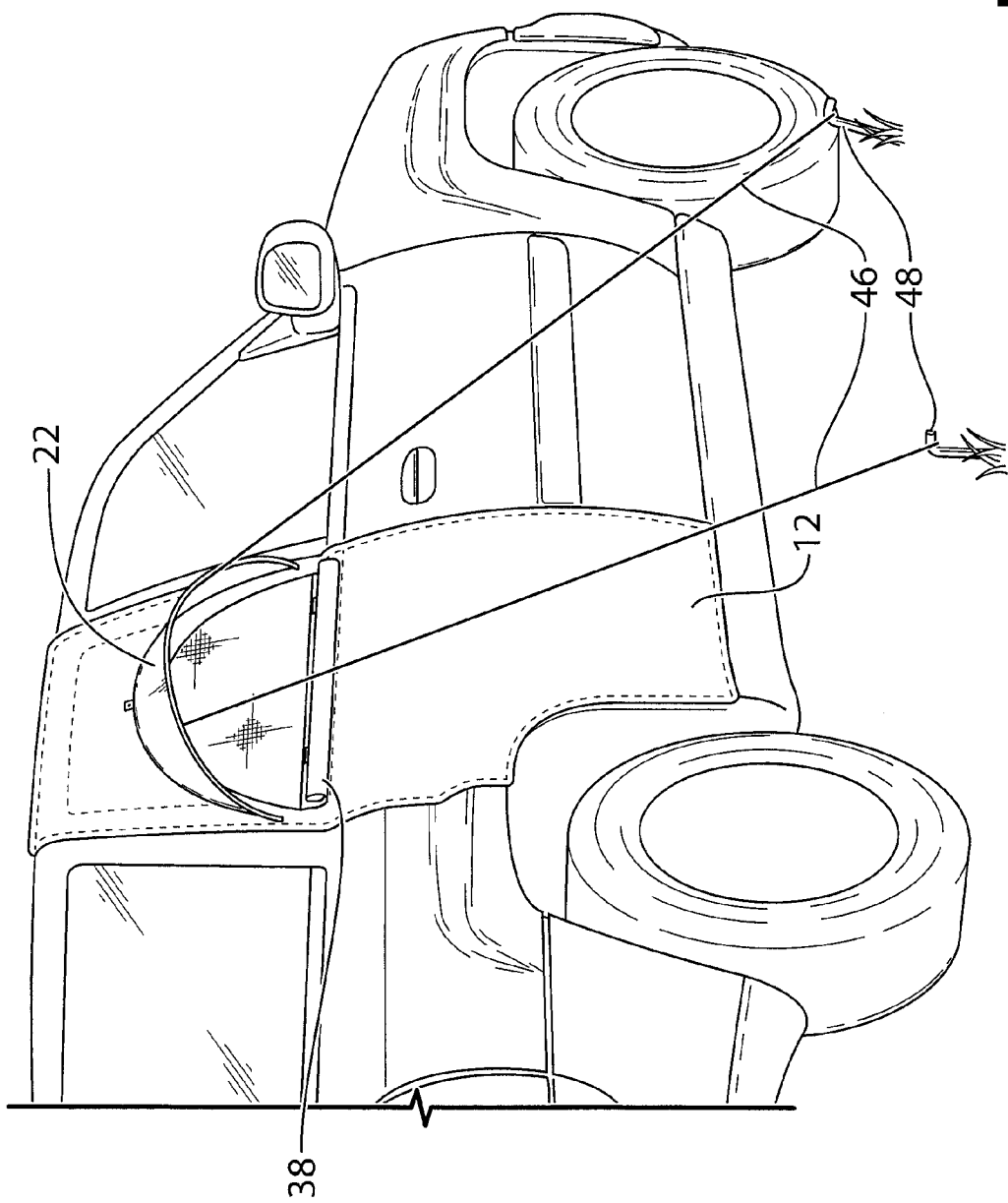
FIG. 7 illustrates the addition of guy wires or tether lines to the window cover to hold the canopy steady in the deployed position.

With reference to FIG. 7, the canopy 22 may be equipped with one or more flexible guy wires or tether lines 46 for anchoring or tethering the canopy 22 to the ground when in the deployed position during use of the window, thereby stabilizing the canopy against wind gusts or other loading. The embodiment of FIG. 7 illustrates use of two such tethers 46 which are attached to the canopy adjacent the distal edge thereof on opposite sides of the canopy's peak. The canopy-attached end of each tether may be tied to the canopy at a suitable anchoring point, examples of which may include a grommet reinforced opening in the canopy sheet, or a tie-off loop defined by a short strip of fabric affixed to the canopy sheet at its opposing ends for tying of the respective tether around the strip through the opening or loop formed by the canopy sheet and the strip attached thereto. The other end of each tether is permanently or releasably coupled to a stake 48, whereby piercing a sharpened end of the stake into the ground at a sufficient distance from the deployed canopy to hold the guy wire or tether line in tension acts to hold the canopy steady against gusting winds or other loads. The stake end of each flexible guy wire or tether line may feature a fixed loop for selectively engaging over a hook of the stake, or may be releasably tied to the stake.

As an example of one possible use of the window cover, it may be employed for the purpose of converting one's vehicle into a camper or tent-like sleeping environment for camping trips, where the mesh screen allows the vehicle window to be kept open to allow circulation of fresh atmospheric air into the vehicle without introducing insects into the vehicle interior, while the canopy can be deployed to guard against rain penetration into the vehicle interior through the mesh covered window space. The canopy can also be used during daylight to obtain a balance between admitting ambient light from the surrounding environment, while shading against direct overhead sun exposure. On the other hand, when more light or a less-obscured sightline is desired, for example in order to easily view the stars on a clear night, the canopy can be collapsed at times when ingress of rain is not an issue. The shade panel 38 allows for full black-out, or reduced light admittance, when desirable, for example to improve ease of sleep during daylight hours. The shade panel can also be closed up in order to add an additional thermal insulation layer over a closed vehicle window in order to improve heat retention in the vehicle interior during cool weather camping conditions.

The full-door coverage of the unit also contributes to reduced possibility of rain penetration by ensuring a lack of of rain-accessible gaps or spaces at a transition between covered and uncovered portions of the vehicle door near the window thereof that might occur during use of partial-coverage window cover designs. For camping applications, the vehicle provides a safer environment than a tent in the event of a bear or other animal attack, heavy winds, falling trees, lightening, or presence of venomous snakes or other wildlife. Full-door elastic retention also allows for a suitable fit on wide variety of vehicle models without requiring custom product dimensions for each and every vehicle. In addition to camping trips, the vehicle can be used as a hotel room alternative for overnight or multi-day road trips, as a drunk driving countermeasure for patrons of rural or cottage country bars where taxi service is not readily available, or as a sleep accessory for semi-truck drivers. The device can also be employed as a temporary cover for a broken vehicle window, and due to the compact foldable/rollable/bunchable nature of the product, can be kept in the vehicle just in case such window damage should occur due to vandalism, extreme weather, etc. The elasticized full-door coverage provides for quick and easy installation and removal, which can be particularly useful in the event of a sudden rain or snow storm, blowing dust, etc. The mess of conventional taping of garbage bags or plastic sheeting over a broken window can be avoided, and the full-door coverage reduces the ease of ingress by animals or people.

The main sheet, canopy sheet and shade panel may be made of the same fabric as one another, or from two or more different fabrics. The deployable and retractable canopy be removably coupled to the main sheet, for example using a zipper fastener between the proximal end of the canopy and the main sheet, in which case a flap is preferably provided on the main sheet to overlie the zippered transition between the two components prevent rain penetration at the zippered joint. Other fastener types (snaps, buttons, hook and loop fasteners, etc.) may alternatively be employed, and may likewise rely on a protective flap to maintain a leak-proof connection. Likewise, fastener types other than the described zippered connection between the shade panel and the main sheet may be employed. As an alternative to hanging the shade 38 in a rolled up position when open in order to keep the same in a rain-protected dry state beneath the canopy 22, the main sheet 22 may incorporate a zippered, button-equipped, snap-equipped or other closeable pocket or pouch into which a folded, rolled or bunched-up shade panel may be stored when in the open position withdrawn from over the window opening. Whether the shade is protected beneath the canopy or within an enclosed space, its lack of exposure to the rain prevents rainwater from being collected on the shade subsequently introduced to the vehicle interior by closing of the shade.

It will be appreciated that the benefit of the deployable and retractable canopy may be employed regardless of whether the particular full-door mounting configuration is employed, and that such a canopy may alternatively be used with on door covers employing alternative mounting details, including partial door covers that only the conceal with the window area of the door, and including any means of holding a partial or full door cover in place, for example using various fasteners, magnets, combinations thereof, etc.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A vehicle window cover apparatus comprising:
    a flexible main sheet configured for selective attachment to a vehicle door in an installed position spanning over a window space bound by a frame of said vehicle door;
    a window opening in the flexible main sheet at a location that overlies the window space of the vehicle door with the flexible main sheet in the installed position;
    a mesh screen attached to the flexible main sheet in a position spanning over the window opening therein;
    a movable canopy connected to the flexible main sheet at an area thereof spanning across a top end of the window opening, the canopy being movable between a deployed position reaching outwardly from the flexible main sheet over the window opening and a collapsed position retracted back toward the flexible main sheet from the deployed position; and
    a flexible window shade separate and distinct from the movable canopy, attached to the flexible main sheet at an area spanning across a bottom end of the window opening, and movable independently of the movable canopy between a closed position spanning over the window opening and blocking airflow therethrough and an open position withdrawn from over the window opening to allow airflow therethrough;
    whereby deployment of the canopy and opening of the flexible window shade places the vehicle window cover in a weather-protected airflow-enabled mode, and collapse of the canopy and closing of the flexible window shade places the vehicle window cover in an airflow-blocking and light-obstructing mode.

2. The vehicle window cover of claim 1 wherein the canopy has a curved shape spanning across the top end of the window opening and downward along opposing sides of the window opening.

3. The vehicle window cover of claim 2 wherein the top end and sides of the window opening are of a curved configuration that conforms with the curved shape of the canopy.

4. The vehicle window cover of claim 1 wherein the canopy comprises a flexible canopy sheet having a proximal end connected or connectable to the flexible main sheet, and a distal edge movable toward and away from the proximal end into the deployed and retracted positions respectively.

5. The vehicle window cover of claim 4 wherein the canopy comprises an edge reinforcement member connected or connectable to the flexible canopy sheet to maintain a predetermined shape of the distal edge thereof.

6. The vehicle window cover of claim 5 wherein the edge reinforcement member is curved.

7. The vehicle window cover of claim 5 wherein a dimension of the flexible canopy sheet measured between the proximal end and the distal edge thereof tapers in lateral directions moving outwardly toward the sides of the window opening from a central position thereover so that the flexible canopy sheet terminates at tapered corner areas of the flexible canopy sheet on the opposing sides of the window opening, and the edge reinforcement member is arranged to span fully from one of said tapered corner areas to the other.

8. The vehicle window cover of claim 5 wherein the flexible canopy sheet comprises an edge-adjacent channel running along the distal edge thereof and the edge reinforcement member is received or receivable in said edge-adjacent channel.

9. The vehicle window cover of claim 4 wherein the movable canopy comprises at least one support member connectable to the flexible canopy sheet in a position running from adjacent the proximal end thereof to adjacent the distal edge thereof in the deployed position.

10. The vehicle window cover of claim 9 wherein the flexible canopy sheet comprises at least one cross-wise channel running cross-wise to the distal edge thereof and the at least one support member is selectively insertable into and removable from said at least one cross-wise channel.

11. The vehicle window cover of claim 1 comprising a securing mechanism operable to secure the movable canopy in the collapsed position.

12. The vehicle window cover of claim 11 wherein the securing mechanism comprises a strap mechanism attached to the flexible main sheet and comprising a fastener operable to secure the strap in a position holding the collapsed movable canopy in place against the flexible main sheet.

13. The vehicle window cover of claim 1 comprising a holding mechanism arranged to secure the flexible shade in a compact condition in the open position that spans a smaller surface area than in the closed position.

14. The vehicle window cover of claim 13 wherein the holding mechanism comprises a first fastening element positioned on a first surface of the window shade that faces inwardly through the window opening in the closed position of said window shade at a location on said first surface adjacent the bottom end of the window, and a mating second fastening element positioned on an opposing second surface of the window shade that faces outwardly away from the window opening in the closed position of said window shade at a location on said second surface that is disposed intermediately between the top and bottom ends of the window opening in the closed position of the window shade.

15. The vehicle window cover of claim 1 comprising a holding mechanism arranged to secure the flexible shade in a protected position that is covered by the deployed position of the canopy.

16. The vehicle window cover of claim 1 wherein the flexible main sheet comprises an elastic member extending substantially around a full perimeter of said main flexible sheet to secure the flexible main sheet to the vehicle door in a position fully spanning an exterior of said vehicle door by stretching of said elastic member around a perimeter of said vehicle door to an interior side of said vehicle door.

17. The vehicle window cover of claim 1 comprising at least one flexible tether having one end thereof coupled to the canopy and an opposing end attached or attachable to a ground stake for anchoring the tether in a tensioned state holding the canopy stable in the deployed position.

* * * * *